United States Patent [19]

Noweck et al.

[11] Patent Number: 6,030,599
[45] Date of Patent: Feb. 29, 2000

[54] PROCESS FOR PRODUCING WATER-DISPERSIBLE ALUMINA HYDRATES HAVING A NANOCRYSTALLINE STRUCTURE AND USE THEREOF

[75] Inventors: Klaus Noweck; Jürgen Schimanski, both of Brunsbüttel; Arnold Meyer, St. Michaelisdonn, all of Germany

[73] Assignee: RWE-DEA Aktiengesellschaft fur Mineraloel und Chemie, Hamburg, Germany

[21] Appl. No.: 08/637,811

[22] PCT Filed: Sep. 15, 1994

[86] PCT No.: PCT/DE94/01089

§ 371 Date: May 3, 1996

§ 102(e) Date: May 3, 1996

[87] PCT Pub. No.: WO95/12547

PCT Pub. Date: May 11, 1995

[30] Foreign Application Priority Data

Nov. 4, 1993 [DE] Germany .............................. 43 37 643

[51] Int. Cl.$^7$ ..................................................... C01F 7/36
[52] U.S. Cl. .................... 423/600; 423/626; 423/628; 423/629; 51/309; 501/153
[58] Field of Search ..................................... 423/626, 630, 423/629, 600, 628; 427/190; 51/309; 501/153

[56] References Cited

U.S. PATENT DOCUMENTS

| | | | |
|---|---|---|---|
| 3,357,791 | 12/1967 | Napier | 423/630 |
| 3,886,264 | 5/1975 | Lindsay et al. | 423/630 |
| 3,887,691 | 6/1975 | Kobetz | 423/630 |
| 3,941,719 | 3/1976 | Yoldas | 252/463 |
| 3,944,658 | 3/1976 | Yoldas | 423/626 |
| 4,010,247 | 3/1977 | Wassermann | 423/629 |
| 4,176,171 | 11/1979 | Bendig et al. | 423/630 |
| 4,202,870 | 5/1980 | Weber et al. | 423/630 |
| 4,244,835 | 1/1981 | Block | 106/401 |
| 4,360,449 | 11/1982 | Oberlander | 423/628 |
| 4,676,928 | 6/1987 | Leach et al. | 252/313.1 |
| 4,952,539 | 8/1990 | Greber | 423/127 |
| 4,992,199 | 2/1991 | Meyer et al. | 106/404 |

FOREIGN PATENT DOCUMENTS

| | | |
|---|---|---|
| 0125507 | 11/1984 | European Pat. Off. . |
| 0238103 | 9/1987 | European Pat. Off. . |
| 0314166 | 5/1989 | European Pat. Off. . |
| 0505896 | 9/1992 | European Pat. Off. . |
| 2311984 | 9/1973 | Germany . |
| 2408233 | 6/1975 | Germany . |
| 3643984 | 8/1987 | Germany . |
| 3824333 | 1/1990 | Germany . |
| 3834773 | 4/1990 | Germany . |
| 6-064918 | 3/1994 | Japan ..................... 423/630 |
| 1431304 | 4/1976 | United Kingdom . |

Primary Examiner—Steven P. Griffin
Assistant Examiner—Peter DiMauro
Attorney, Agent, or Firm—Madan, Mossman & Sriram P.C.

[57] ABSTRACT

A process for producing alumina hydrates having a boehmite structure is provided. These alumina hydrates are dispersible in water. The boehmite or pseudoboehmite in colloids having a pH value of between 3 and 7 is present in a nanocrystalline form (<4 nm) whereby an exceptionally high translucence is imparted to the colloid.

25 Claims, No Drawings

PROCESS FOR PRODUCING WATER-DISPERSIBLE ALUMINA HYDRATES HAVING A NANOCRYSTALLINE STRUCTURE AND USE THEREOF

This application is a 371 of International Application No. PCT/DE94/01089, filed Sep. 15, 1994.

This invention relates to a process for producing water-dispersible, nanocrystalline alumina hydrates having a boehmite structure and to the use of said materials.

The physical and chemical properties of alumina hydrates primarily depend on the parameters of the manufacturing process. Manufacturing processes are known whereby special product properties required for specific applications are provided. The production of water-dispersible alumina hydrates, too, has already been described.

According to DE 2 408 233-C2, an acid-dispersible boehmite is used and gaseous acids, e g. hydrogen chloride or $NO_2$, are passed over said powdery material predominantly in a fluidized bed. Said process uses commercially available boehmite powders as starting materials which have to be aftertreated to make them water-dispersible. As a result of the high intrinsic crystallinity of the powdery starting materials (>5 nm, determined by radiographic analysis on the 021 reflex of the boehmite), said aftertreated powders, after the addition of water, yield colloidal systems which are highly dispersible (D>97%), but have a milky, turbid appearance. Said colloidal systems have low translucence values ranging from 0 to 50%.

The translucence value is a measure of the size of the colloidal boehmite particles present in the suspension: the higher the translucence value, the smaller the colloids; the smaller the colloids in the suspension, the larger the specific surface of the suspension; the larger the specific surface of the suspension, the higher the binding strengths of the particles.

According to U.S. Pat. No. 4,676,928-A, there are added acids to an alumina hydrate suspension obtained from the aqueous phase of the Ziegler process. The treated alumina hydrate suspension having a pH value of between 5 and 9 is subjected to thermal aging and dried. The crystallinity of the alumina hydrate increases considerably during aging. The crystallites reach sizes of 8.5 to 25 nm. The boehmite powders produced by said process are also readily water-dispersible (D>98%), but said powders, too, yield milky to milky-turbid suspensions having translucence values of 0.5 to 50%. In this case, too, the reason for turbidity is the high crystallinity of the alumina hydrate suspension which is even enhanced by subsequent hydrothermal aging.

Either of said processes is used to provide high solids contents (up to 30%) in the ready-to-use alumina hydrate suspensions, but even by dilution of the milky-turbid suspensions to obtain comparably low solids contents (about 5 to 10%) the poor translucence values cannot be improved. The reason for low translucence is the degree of crystallinity of the starting materials. The boehmites produced according to said processes yield suspensions having particle diameters of >100 nm.

According to EP 0 505 896-A1, commercially available alumina hydrates of different crystalline structures (alumina monohydrates or alumina trihydrates or similar products) are used for producing water-dispersible boehmite. In a dissolving process, the highly crystalline aluminum component reacts with a large quantity of nitric acid at a pH value of less than 3.5 and elevated pressure and temperature. The resultant boehmite alumina hydrates are crystalline and dispersible in water. The materials produced by said process present crystallite sizes of greater than 6 nm (measured on the 021 reflex) and are primarily used for producing abrasives.

None of the manufacturing processes described hereinabove provides in a direct way a water-dispersible alumina hydrate powder having a boehmite structure. Said processes are expensive because commercially available standard products are used as starting materials which have to be made water-dispersible by expensive subsequent upgrading. The crystallinity of the products produced according to said processes is higher than 5 nm. Up to now, it has not been possible to provide water-dispersible materials having smaller crystallites than those known in the art. Said processes inevitably provide water-dispersible materials having even larger crystals whereby translucence is reduced.

As can readily be inferred from the explanations made hereinabove, it was an object of this invention to develop a process for producing alumina hydrates having lower crystallinities, while maintaining their water-dispersible features and, thus, to provide alumina hydrates having higher binding strengths.

According to this invention, there is provided a process in which aluminum trialcoholates or partially substituted aluminum monoalcoholates or aluminum dialcoholates having chain lengths of $C_2$–$C_{10}$ or aluminum alcoholate mixtures, such as those obtained as intermediates in the Ziegler-Alfol synthesis, are converted into nanocrystalline alumina hydrates having a boehmite structure, which conversion comprises hydrolysis and polycondensation in the presence of understoichiometric quantities of polymerization inhibitors, namely inorganic or organic, monovalent acids or the anhydrides thereof which may optionally comprise an additional functional group, the material being added either to the aluminum alcoholate and/or to the water of hydrolysis, the alcoholic components are substantially removed by stripping and the reaction product is dried if necessary.

According to an embodiment of the instant invention, the polymerization inhibitors used are inorganic acids, particularly hydrochloric acid or hydrogen chloride, nitric acid or $NO_2$ gas, carbonic acid or $CO_2$, or organic acids, particularly formic acid, acetic acid, propionic acid or the anhydrides thereof or short-chain, monovalent organic acids which may optionally comprise an additional functional group, particularly the hydroxyl group, the chloride group or the amino group.

It is preferred that aluminum alcoholates having chain lengths of $C_3$ to $C_6$ be converted.

The polymerization inhibitors are particularly added at a mole equivalent ratio of 0.1 to 1.5, preferably 0.1 to 0.5, referring to 1 mole equivalent of aluminum.

The conversion is preferably carried out at temperatures of 30° C. to 110° C., preferably of 60° C. to 110° C.

According to another embodiment of this invention, an additional understoichiometric quantity of acid is added to the alumina hydrate after stripping, the maximum as specified hereinabove not being exceeded.

According to another embodiment of this invention, the aqueous alumina hydrate suspensions are subjeced to hydrothermal post-aging whereby the alumina hydrate particles are stabilized without altering their structures such that the subsequent drying step will prevent aggregation of the primary agglomerates.

The instant invention further relates to the use of said alumina hydrates produced according to this invention and dispersed in water and having an $Al_2O_3$ content of 1 to 20%, particularly 5 to 15%, preferably about 10%, particularly for coating materials such as glass, metals or plastics to protect said materials from chemical and/or thermal attack. In particular, organic viscosity modifiers, such as celluloses, latices or polyacrylates, are added to said alumina hydrates.

The dried alumina hydrates produced according to this invention are particularly used for the manufacture of catalyst supports having high strengths or mixing with other oxidic materials or their precursors on a nanocrystalline basis whereby true-phase mixed oxide crystals are formed by calcination, particularly for producing spinels or mullites or producing high-performance abrasives, whereby preferably by addition of $Al_2O_3$ nuclei in the form of bayerite or the eta phase thereof and acid a gel is obtained which, after dehydration to form the alpha phase, yields a microcrystalline corundum.

Three-dimensional linkage of the Al—OH groups can be prevented for a long time by incorporating the polymerization modifiers into either reactant or into the water used in the production of synthetic alumina hydrates according to this invention. For the quantitative inhibition of an Al—OH group, the reaction stoichiometry normally requires at least 1 mole of polymerization modifier in order to inhibit the condensation capability of said group during hydrolysis or post-aging. However, it has surprisingly been found that optimum inhibition is attained when using the polymerization modifier in understoichiometric quantities, i. e. quantities of less than 1 mole, and that it is irrelevant, in principle, whether the polymerization modifier is introduced into the aluminum alcoholate, thus resulting in preconditioning of the organic reactant, or whether the polymerization modifier is directly added to the water of hydrolysis. Either procedure is possible.

For the first time, the process steps according to this invention allow to produce in a direct way nanocrystalline boehmite alumina hydrates having a crystallite size of<4.0 nm (measured on the 021 reflex) which are dispersible in water and yield clear, translucent colloids. Said nanocrystalline materials produced according to this invention are suitable for a large number of applications. The high binding strengths of said materials allow to produce temperature-resistant coatings on glass, ceramics or refractory materials without necessitating complex, cross-linking, organic matrices for fixing the inorganic species. Coatings based on nanocrystalline alumina hydrates supplement widely used processes in which solvents are employed, e. g. ormocer (organic modified ceramics) coating processes.

Ormocers are based on hydrolyzable aluminum alcoholates which have to be reacted in multiphase reaction systems with at least bifunctional organic molecules. The resultant nanocrystalline compounds can only be stabilized in specific organic solvents. Said materials are not dispersible in water. In general, ormocers are fixed on the material to be coated by photochemical reaction whereby the bifunctional organic groups which have previously been introduced are linked (see e. g. DE 3 824 333-A1 and DE 3 834 773-A1).

The nanocrystalline alumina hydrates produced according to this invention which are also suitable for said ceramic applications are termed amocers (acid modified ceramics) by analogy with ormocers. In contrast to ormocers, amocers are stabilized and fixed in aqueous media.

Besides the unique advantages described hereinabove, said materials also improve the properties of catalysts produced therefrom. Such catalysts normally consist of a support and a catalytic material applied to the support. Alumina is frequently used as a carrier material due to its porous structure. A high porosity is desirable in order to attain good diffusion rates of the reactants. On the other hand, the catalyst support must be highly resistant to breaking so that it is capable of withstanding extrinsic forces. In order to meet these requirements it is desirable to have available an alumina hydrate which has a high porosity and shows a high binding strength to enhance the breaking resistance of the material. A high binding strength is ensured whenever the alumina hydrate, in its catalytically active form (the gamma phase), has a large surface. In comparison with other water-dispersible aluminas, the nanocrystalline alumina hydrates produced according to the process of this invention present very large surfaces in the gamma phase, namely up to 345 $m^2/g$ after activation at 550° C. for three hours. Hence, materials having said characteristics also offer some interesting uses as stabilizers for catalyst supports.

Nanocrystalline, water-dispersible alumina hydrates can be used in many different ways. For instance, they can be used as pore modifiers in the synthesis of inorganic membranes, for producing abrasives, as starting materials for synthetic, true-phase mixed oxides, e. g. spinels or mullites, as thickeners for lacquers and as catalyst support material.

The following examples shall illustrate the process of this invention and the use of the products produced according to the instant invention.

The following analytical methods were employed for characterizing the synthesized products:

Crystallite Size

The crystallite size of the synthsized alumina hydrate was determined by X-ray diffraction on the 021 reflex of the boehmite and was calculated by the Scherrer formula:

$$\text{Crystallite size}_{021\ reflex}[\text{nm}] = \frac{K \times \text{lambda} \times 57.3}{\text{beta} \times \cos 2\, \text{theta}}$$

where:

$K$ = constant for powder particles (shape factor) = 0.9 lambda = wavelength of X-rays = 0.15406 nm beta = corrected line broadening for X-ray gonimeters, reflex-dependent theta = reflex-dependent; here: approx. 28°

Dispersibility

A certain quantity of the alumina hydrate produced was stirred for 10 minutes into a certain quantity of water. A sufficient quantity of alumina hydrate was chosen to prepare a colloid containing 10% $Al_2O_3$, the dispersibility being 100%. The nondispersed particles of the colloid were removed by centrifugation (20 minutes at 2,400 rpm). The nondispersed quantity was dried at 120° C. for 5 hours and weighed. The dispersibility was calculated by the following equation:

$$\text{Dispersibility}[\%] = 100\% - \text{dry residue}[\%]$$

Translucence

The supernatant of the centrifuged colloid as described hereinbefore was diluted at a ratio of 1:10 and subjected to spectrophotometric analysis at 450 nm in a 1-cm cuvette. Water was taken as a blank. The translucence was stated in %.

Pore Volume

A sample of alumina hydrate was activated at 550° C. for 3 hours. The pore volume was determined in accordance with ASTM method D 4284-83. The results refer to pore radii of up to 100 nm.

Surface

The surface of the alumina hydrate sample activated at 550° C. for 3 hours was determined in accordance with ASTM method D 4567-86.

EXAMPLES OF PREPARATION

EXAMPLE 1

Polymerization Modifier

The experiments 1 to 3 described in this example illustrate the influence of different amounts of polymerization modifier added in order to precondition the alcoholate reactant, on water dispersibility and translucence of the product. The correlations are explained on a reaction system comprising acetic anhydride and aluminum triisopropylate used in the experiments 1 to 3. The physical data of the alumina hydrates prepared in the experiments 1 to 3 are listed in Table 1. It is surprising that the highest degree of water dispersibility and the best translucence values are attained when using an understoichiometric amount of acetic anhydride (see experiment no. 2).

Experiment No. 1

The polymerization modifier/aluminum alcoholate mole ratio was 1.

Aluminum triisopropylate (DOROX® D 10) (1.47 moles of Al) was melted at 130° C., diluted with isopropyl alcohol and mixed with 150 g (1.47 moles) of acetic anhydride. The propyl acetate thus formed was distilled off. The remaining reactant then was hydrolyzed with distilled water at approx. 80° C., the aluminum alcoholate/water mole ratio being 1:26. A clear white alumina hydrate precipitate was obtained. Water was added to said alumina hydrate suspension which then was subjected to azeotropic distillation in order to remove most of the alcohol component set free. The suspension was subsequently aged at 85° C.–90° C. for three hours whereby it became more and more translucent. The pH value of the suspension cooled to room temperature was 4.3. The aqueous alumina hydrate suspension was dried by means of a customary laboratory spray drier.

Experiment No. 2

The polymerization modifier/aluminum alcoholate mole ratio was 0.5.

Aluminum triisopropylate (DOROX® D 10) (1.47 moles of Al) was melted at 130° C., diluted with isopropyl alcohol and mixed with 75 g (0.73 mole) of acetic anhydride. The experiment was continued as described in experiment no. 1. The pH value of the suspension cooled to room temperature was 4.6 prior to spray drying.

Experiment No. 3

The polymerization modifier/aluminum alcoholate mole ratio was 0.12.

Aluminum triisopropylate (DOROX® D 10) (1.47 moles of Al) was melted at 130° C., diluted with isopropyl alcohol and mixed with 18.5 g (0.18 mole) of acetic anhydride. The experiment was continued as described in experiment no. 1. The pH value of the suspension cooled to room temperature was 5.2 prior to spray drying.

EXAMPLE 2

Use of Mixed Alcoholates or Al-tri-n-hexanolate

Experiment no. 4 described in this example illustrates that, according to the instant invention, also long-chain aluminum alcoholates are suitable for producing alumina hydrates which are dispersible in water and have high translucence values. The correlation is explained on a reaction system comprising acetic anhydride and Al-tri-n-hexanolate which was used in experiment no. 4.

The physical data of the alumina hydrate prepared in experiment no. 4 are listed in Table 1. It was surprising that, despite the reduced hydrolysis rate of the longchain Al-tri-n-hexanolate, the water dispersibility and translucence values were as high as those obtained with the short-chain Al-triisopropylate when using an understoichiometric amount of acetic anhydride (see experiment no. 2).

Experiment No. 4

The polymerization modifier/aluminum alcoholate mole ratio was 0.5.

Melted, hexanol-containing Al-tri-n-hexanolate or mixed alcoholate from the Ziegler/Alfol process was mixed in quantities of 1.47 moles with 0.73 mole of acetic anhydride. The temperature was 130° C. The reactant then was hydrolyzed with distilled water at approx. 80° C., the aluminum alcoholate/water mole ratio being 1:26. A white alumina hydrate precipitate was obtained. Water was added to said alumina hydrate suspension which then was distilled in order to remove most of the alcohol or ester component set free. The suspension was subsequently aged at 85° C.–90° C. for three hours whereby it became more and more translucent. The pH value of the suspension cooled to room temperature was 4.0. The aqueous alumina hydrate suspension was dried by means of a customary laboratory spray drier.

EXAMPLE 3

Post-Aging Period

Example 3 illustrates that, according to this invention, the post-aging period of the stripped alumina hydrate suspension has a positive effect on the water dispersibility and translucence of the suspension. The correlations are explained by experiment no. 5 and no. 6 using a reaction system comprised of acetic acid and aluminum triisopropylate. The polymerization modifier was used in extremely understoichiometric quantities (0.12 mole/mole of Al).

The physical data of the alumina hydrates prepared in the experiments 5 and 6 are listed in Table 1.

Experiments No. 5 and No. 6

The polymerization modifier/aluminum alcoholate mole ratio was 0.12.

The experiments were carried out as described in experiment no. 3, the difference being that, instead of acetic anhydride, acetic acid (0.18 mole) was used as a polymerization modifier and that the aging period in experiment no. 6 was increased to 8 hours at 85° C.–90° C.

TABLE 1

Physical Data of the Amocers Prepared in Experiments 1–6

| Example | 1 | | 2 | | 3 | |
|---|---|---|---|---|---|---|
| Experiment | No. 1 | No. 2 | No. 3 | No. 4 | No. 5 | No. 6 |
| Al-alcoholate | Al-tri-iso-propylate | Al-tri-iso-propylate | Al-tri-iso-propylate | Al-tri-n-hexanolate | Al-tri-iso-propylate | Al-tri-iso-propylate |
| Polymerization modifier (PM) | Acetic anhydride | Acetic anhydride | Acetic anhydride | Acetic anhydride | Acetic acid | Acetic acid |
| mole of PM/mole of Al | 1.0 | 0.5 | 0.12 | 0.5 | 0.12 | 0.12 |
| Aging period | 3 hours | 3 hours | 3 hours | 3 hours | 3 hours | 8 hours |
| Aging temperature | 85–90° C. | 85–90° C. | 85–90° C. | 85–90° C. | 85–90° C. | 85–90° C. |
| % $Al_2O_3$ | 50.7 | 59.6 | 70.3 | 63.1 | 65.9 | 69.2 |
| Suspension of 10% $Al_2O_3$ in water | | | | | | |
| % Dispersibility | 93.9 | 97.9 | 82.6 | 99.1 | 90.9 | 98.2 |
| % Translucence | 79.8 | 97.4 | 74.0 | 97.8 | 71.6 | 85.0 |
| Crystallite size (nm) | <4 | <4 | <4 | <4 | <4 | <4 |
| Surface ($m^2/g$) 3 hours, 550° C. | 345 | 303 | 283 | 318 | 288 | 293 |
| Pore volume (ml/g) 3 hours, 550° C. | 0.85 | 0.72 | 0.50 | 0.61 | 0.56 | 0.74 |
| Phase | | | Nanocrystalline boehmite | | | |
| pH value of the suspension prior to drying | 4.3 | 4.6 | 5.2 | 4.0 | 5.1 | 5.7 |

EXAMPLE 4

Additional Amount of Acid

Example 4 illustrates that, according to the claims of this invention, an additional amount of a monovalent acid added for instance to the alumina hydrate suspension after aging of the stripped suspension, has a positive effect on the water dispersibility and translucence of the suspension. The additional amount of acid added, in this case acetic acid, is not intended to inhibit polymerization, but to increase the water dispersibility of the resultant alumina hydrate. Furthermore, the viscosity of the suspension is stabilized. The correlations are explained by experiment no. 7 and no. 8 using a reaction system comprised of acetic acid and aluminum triisopropylate.

The physical data of the alumina hydrates prepared in the experiments 7 and 8 and the viscosity-stabilizing effect produced by the additional amount of acid are shown in Table 2.

Experiment No. 7

The polymerization modifier/aluminum alcoholate mole ratio was 0.5.

Melted Al-triisopropylate containing isopropyl alcohol was mixed in quantities of 1.47 moles with 0.73 mole of acetic acid. The temperature was 95° C. This mixture then was hydrolyzed with distilled water at approx. 80° C., the aluminum alcoholate/water mole ratio being 1:26. Water was added to the alumina hydrate suspension thus formed which then was substantially freed from alcohol by distillation. The suspension was subsequently aged at 85° C. to 90° C. for three hours. The alumina hydrate suspension thus obtained was further treated as described in experiment no. 1.

Experiment No. 8

The polymerization modifier/aluminum alcoholate mole ratio was 0.5.

The experiment was carried out as described in experiment no. 7, the difference being that, after aging at 85° C. to 90° C. for 3 hours, an additional amount of acetic acid (0.06 mole/mole of Al) was added to the stripped alumina hydrate suspension. The acidified alumina hydrate suspension was further treated as described in experiment no. 1.

EXAMPLE 5

Different Organic Acids

Example 5 illustrates that, according to this invention, different monovalent organic acids may be used as polymerization modifiers. The correlation is explained by experiment no. 10, 11 and 12 using a reaction system comprised of acetic acid or propionic acid or lactic acid and Al-tri-n-hexanolate. The physical data of the alumina hydrates prepared in the experiments 10, 11 and 12 are shown in Table 2.

Experiment No. 9

The polymerization modifier/aluminum alcoholate mole ratio was 0.12.

Melted Al-tri-n-hexanolate containing hexanol was mixed in quantities of 1.47 moles with 0.18 mole of acetic acid. The temperature was 90° C. This turbid mixture then was hydrolyzed with distilled water at approx. 80° C., the aluminum alcoholate/water mole ratio being 1:26. Water was added to the alumina hydrate suspension thus formed which then was substantially freed from alcohol by distillation. The suspension was subsequently aged at 85° C. to 90° C. for three hours. Based on the experience gathered in example 4, an additional amount of acetic acid (0.017 mole/mole of Al) was added to the alumina hydrate suspension. The pH value of the suspension was 4.2 prior to spray drying. The product was further treated as described in experiment no. 1.

Experiment No. 10

The polymerization modifier/aluminum alcoholate mole ratio was 0.12.

The experiment was carried out as described in experiment no. 9, the difference being that propionic acid was used instead of acetic acid. The pH value of the alumina hydrate suspension was 4.6 prior to spray drying. The product was further treated as described in experiment no. 1.

Experiment No. 11

The polymerization modifier/aluminum alcoholate mole ratio was 0.12.

The experiment was carried out as described in experiment no. 9, the difference being that lactic acid was used instead of acetic acid and that the additional amount of lactic acid added was increased to 0.06 mole/mole of Al. The pH value of the alumina hydrate suspension was 4.5 prior to spray drying. The product was further treated as described in experiment no. 1.

EXAMPLE 6

Different Inorganic Acids

Example 6 illustrates that, according to this invention, different monovalent inorganic acids or acid anhydrides may be used as polymerization modifiers. The correlation is explained by experiment no. 12 and no. 13 using a reactant system comprising hydrogen chloride or nitric acid and Al-tri-n-hexanolate. The physical data of the alumina hydrates prepared in the experiments 12 and 13 are shown in Table 2.

Experiment No. 12

The polymerization modifier/aluminum alcoholate mole ratio was 0.12.

There was introduced 0.18 mole of hydrogen chloride into 1.47 moles of melted Al-tri-n-hexanolate containing hexanol. The temperature was 90° C. The greenish reactant mixture was hydrolyzed with distilled water at approx. 80° C., the aluminum alcoholate/water mole ratio being 1:26. Water was added to the resultant alumina hydrate suspension which then was substantially freed from alcohol by distillation. The suspension was subsequently aged at 85° C.–90° C. for three hours. The alumina hydrate suspension had a pH value of 3.9. The product was further treated as described in experiment no. 1.

Experiment No. 13

The polymerization modifier/aluminum alcoholate mole ratio was 0.12.

The experiment was carried out as described in experiment no. 12, the difference being that instead of hydrogen chloride fuming nitric acid (0.18 mole) was added in drops to the aluminum alcoholate. The pH value of the alumina hydrate suspension was 5.0 prior to spray drying. The product was further treated as described in experiment no. 1.

TABLE 2

Physical Data of the Amocers Prepared in Experiments 7–13

| Example | 4 | | 5 | | | 6 | |
|---|---|---|---|---|---|---|---|
| Experiment | No. 7 | No. 8 | No. 9 | No. 10 | No. 11 | No. 12 | No. 13 |
| Al-alcoholate | Al-tri-iso-propylate | Al-tri-iso-propylate | Al-tri-n-hexanolate | Al-tri-n-hexanolate | Al-tri-n-hexanolate | Al-tri-n-hexanolate | Al-tri-n-hexanolate |
| Polymerization modifier (PM) | Acetic acid | Acetic acid | Acetic acid | Propionic acid | Lactic acid | Hydrogen chloride | Fuming $HNO_3$ |
| mole of PM/mole of Al | 0.5 | 0.5 | 0.12 | 0.12 | 0.12 | 0.12 | 0.12 |
| Aging period | 3 hours | 3 hours | 3 hours | 3 hours | 3 hours | 3 hours | 3 hours |
| Aging temperature | 85–90° C. | 85–90° C. | 85–90° C. | 85–90° C. | 85–90° C. | 85–90° C. | 85–90° C. |
| Additional quantity of acid added (mole/mole of Al) | none | 0.06 after aging | 0.017 after aging | 0.017 after aging | 0.06 after aging | none | none |
| % $Al_2O_3$ | 57.3 | 57.4 | 66.6 | 68.1 | 61.9 | 66.2 | 64.5 |
| Suspension of 10% $Al_2O_3$ in water | | | | | | | |
| % Dispersibility | 94.5 | 98.0 | 99.3 | 98.7 | 99.1 | 98.5 | 97.6 |
| % Translucence | 93.8 | 96.3 | 95.5 | 92.4 | 96.1 | 94.5 | 94.9 |
| Viscosity after | | | | | | | |
| 1 day (mPa.s) | 54 | 24 | * | * | * | * | * |
| 5 days (mPa.s) | 1,480 | 54 | * | * | * | * | * |
| Crystallite size (nm) | <4 | <4 | <4 | <4 | <4 | <4 | <4 |
| Surface ($m^2/g$) 3 hours, 550° C. | 317 | 321 | 300 | 299 | 335 | 222 | 277 |
| Pore volume (ml/g) 3 hours, 550° C. | 0.67 | 0.71 | 0.54 | 0.54 | 0.38 | 0.31 | 0.38 |
| Phase | | | Nanocrystalline boehmite | | | | |
| pH value of the suspension prior to drying | <6 | <6 | 4.2 | 4.6 | 4.5 | 3.9 | 5.0 |

*not determined

EXAMPLE 7

Polymerizaton Modifiers in the Water Phase

Example 7 illustrates by experiment no. 14 and no. 15 that it is possible, without preconditioning, to prevent the hydrolyzable aluminum alcoholates from three-dimensional linkage of the Al(OH) groups formed during hydrolysis. This is achieved by adding the polymerization modifiers as claimed herein to the water phase used for hydrolysis. In experiment no. 14, Al-tri-isopropylate and aqueous acetic acid are used, while in experiment no. 15 Al-tri-n-hexanolate and aqueous $HNO_3$ are used as reactants. The physical data of the resultant alumina hydrates are shown in Table 3.

Experiment No. 14

The polymerization modifier/aluminum alcoholate mole ratio was 0.17.

Melted Al-tri-isopropylate containing isopropyl alcohol (DOROX® D 10) (1.15 moles) was gradually added in drops to water which had previously been acidified with 11.9 grams of acetic acid (0.173 mole/mole of Al). The temperature was 80° C. The aluminum alcoholate/water mole ratio was 1:41. Said mixture was maintained at 80° C. for about 45 minutes. Water was added to the resultant alumina hydrate suspension which then was substantially freed from alcohol by distillation. The suspension was subsequently aged at 95° C. for four hours. The product was further treated as described in experiment no. 1.

Experiment No. 15

The polymerization modifier/aluminum alcoholate mole ratio was 0.17.

Melted Al-tri-n-hexanolate containing hexanol (1.15 moles) was gradually added in drops to water which had previously been acidified with 20.1 grams of $HNO_3$ (65% solution) (0.194 mole/mole of Al). The temperature was 75° C. The aluminum alcoholate/water mole ratio was 1:15. Said mixture was maintained at 75° C. for about 60 minutes. Water was added to the resultant alumina hydrate suspension which then was substantially freed from alcohol by distillation. The suspension was subsequently aged at 95° C. for six hours. The product was further treated as described in experiment no. 1.

EXAMPLES OF APPLICATIONS

EXAMPLE 8

Coating of Glass

Example 8 (experiment no. 16) illustrates that it is possible to apply a transparent coating to a material, in this case glass, when using said nanocrystalline alumina hydrate suspension. Contrary to conventional processes, the coating is formed from an aqueous phase without any complex solvent systems. The coating thickness can be adjusted by the viscosity of the suspension. The coating is fixed on the material (here: glass) by drying at 20° C. to 120° C. At temperatures of higher than 450° C. said coating is converted into the gamma phase whereby the material is protected from chemical and/or thermal attack.

Experiment No. 16

There were 11.3 grams of the alumina hydrate powder prepared in experiment no. 15 stirred into 68.7 grams of water. After stirring for 10 minutes, a suspension containing 10% $Al_2O_3$ was obtained. In a lab-scale centrifuge said suspension was freed from nondispersed material (20 minutes at 2,400 rpm). The viscosity of the suspension was less than 20 mPa·s. The suspension was evacuated in order to eliminate trapped air. The supports used for coating were commercially available slides (75×25×3 mm) normally used for microscopic examinations. Grease and dust had been removed from the slides prior to coating. After an immersion period of about 2 minutes, the slides were pulled out from the suspension by means of a motor in order to guarantee a thin and uniform coating (pulling rate about 2.5 cm/minute). After drying at room temperature, the coated slides were heated to 550° C. in a muffle furnace.

To test the thermostability of said coated slides, they were held for three minutes in the flame of a burner (flame temperature>1,300° C.) and compared with an uncoated slide. The uncoated slide melted, while the coated slide remained surprisingly stable.

TABLE 3

Physical Data of the Amocers Prepared in Experiments 14–15

| Example | 7 | |
| --- | --- | --- |
| Experiment | No. 14 | No. 15 |
| Al-alcoholate | Al-tri-isopropylate | Al-tri-n-hexanolate |
| Polymerization modifier (PM) | Acetic acid | Nitric acid |
| mole of PM/mole of Al | 0.17 | 0.17 |
| Aging period | 4 hours | 6 hours |
| Aging temperature | 95° C. | 95° C. |
| % $Al_2O_3$ | 69.2 | 72.5 |
| Suspension of 10% $Al_2O_3$ in water | | |
| % Dispersibility | 98.0 | 98.8 |
| % Translucence | 94.2 | 91.1 |
| Crystallite size (nm) | <4 | <4 |
| Surface ($m^2$/g) 3 hours, 550° C. | 320 | 296 |
| Phase | Nanocrystalline boehmite | |

EXAMPLE 9

Preparation of Supports

Example 9 (experiment no. 17) illustrates that stable catalyst supports (here as beads) can be produced using known processes (DE 3 212 249-C 2). A stable support having a highly resistant gamma-phase surface was prepared. The physical data of said spherical support are shown in Table 4.

Experiment No. 17

A spherical catalyst support was prepared on the basis of the alumina hydrate prepared in experiment no. 15. There were 40.8 g of alumina hydrate powder stirred into 158.3 q of water which had previously been mixed with 0.5 g of $HNO_3$ (65% solution). After stirring for 10 minutes, the resultant suspension was aerated. The spherical catalyst support was prepared by dripping said suspension through an 0.8-mm nozzle into a 6% aqueous ammonia solution. The resultant alumina hydrate beads were washed, dried and heated at 550° C. for 3 hours in a muffle furnace whereby they were converted into the catalytically active gamma phase.

TABLE 4

Physical Data of the Spherical Support Prepared in Experiment No. 17 (activated at 550° C. for 3 hours)

| | |
|---|---|
| Strength | 200 N/bead |
| Water resistance | 100% |
| Diameter | 1.74 mm |
| Surface | 261 m$^2$/g |
| Pore volume (up to 100 nm) | 0.49 ml/g |

EXAMPLE 10

Preparation of Mixed Oxides

Example 10 (experiments 18 and 19) illustrates that mixed oxides, such as MgO spinel or mullite, can be produced using said water-dispersible alumina hydrates. The special feature of this process for producing mixed oxides is that said process allows to regularly fix synthetic, oxidic, nanocrystalline components such that true-phase crystals are formed in the mixed oxide during subsequent calcination.

Experiment No. 18

Preparation of Spinels Spinel Stoichiometry: 72% Al$_2$O$_3$/28% MgO

A 50% magnesium acetate solution was stirred into an aqueous suspension of the alumina hydrate powder containing 10% Al$_2$O$_3$ which had been prepared in experiment no. 14 until the spinel stoichiometry was reached. The product was stirred for 10 minutes and then spray dried. The resultant alumina hydrate powder was calcined at 700° C. and 1,300° C. The MgO spinel thus formed presented a true-phase crystallization.

Experiment No. 19

Preparation of Mullites Mullite Stoichiometry: 72% Al$_2$O$_3$/28% SiO$_2$

Sodium-free ortho-silicic acid was prepared by ion exchange of a 6% sodium silicate solution. Said silicic acid was stirred into the aqueous alumina hydrate suspension containing 10% Al$_2$O$_3$ which had been prepared in experiment no. 15 until the mullite stoichiometry was reached. The product was spray dried and then calcined at 1,250° C. for 3 hours. The X-ray sectrum presented a true-phase crystallization.

EXAMPLE 11

Preparation of Abrasives

Today, most high-performance abrasives are made from microcrystalline corundum. Microcrystalline corundum was prepared from the alumina hydrate according to this invention. It was surprisingly found that particularly appropriate corundum can be prepared when adding etaphase alumina nuclei to the alumina suspension. This is illustrated in the following by experiment no. 20.

Experiment No. 20

A suspension containing 20% Al$_2$O$_3$ was prepared from the product obtained in experiment no. 15. There was added 1.0% fine-grained eta-phase alumina (100%<2 μm and 50%<0.6 μm) as nuclei to said suspension. The thickened suspension was dried at 120° C. and converted into alpha alumina at 1,130° C. By addition of the eta-phase nuclei it was thus possible to prepare micro-crystalline alpha alumina at low temperatures. The crystallite size of said corundum was in the range of 60 nm to 90 nm (measured on the 113 reflex). Said corundum is an excellent high-performance abrasive.

We claim:

1. A process for producing water-dispersible alumina hydrates which give clear, translucent colloids when dispersed in water, comprising the steps of
   converting aluminum alcoholates selected from the group consisting of aluminum trialcoholates, partially substituted aluminum monoalcoholates, aluminum dialcoholates, and mixtures thereof; which aluminum alcoholates have chain lengths of C$_2$–C$_{10}$ into nanocrystalline alumina hydrates with crystallite sizes of smaller than 4 nm, measured on the 021 reflex, which conversion is carried out at temperatures of 30° C. to 110° C. and comprises hydrolysis and polycondensation
   in the presence of water of hydrolysis and
   an understoichiometric quantity of at least one polymerization inhibitor selected from the group consisting of inorganic and organic, monovalent acids, said organic, monovalent acids being selected from the group consisting of formic acid, acetic acid, propionic acid and the anhydrides thereof, and organic acids as defined above comprising an additional functional group selected from the group consisting of the hydroxyl group, the chloride group and the amino group,
   where the polymerization inhibitor is added either to the aluminum alcoholate and/ or to the water of hydrolysis, and
   substantially removing alcoholic components
   wherein the water-dispersible alumina hydrates when dry have the following properties:
   a dispersibility of greater or equal to 82.6% where 10 wt. % of the hydrates, calculated as Al$_2$O$_3$ are mixed with only water, and
   a translucency of greater than or equal to 71.6% measured by spectroscopic analysis at 450 nm from a dispersion made as described above and further diluted 1:10 with water.

2. The process according to claim 1, wherein said polymerization inhibitors are inorganic acids, selected from the group consisting of hydrochloric acid and hydrogen chloride, nitric acid and NO$_2$ gas, carbonic acid and CO$_2$.

3. The process according to claim 1 wherein the aluminum alcoholates have chain lengths of C$_3$ to C$_6$.

4. The process according to claim 1 wherein the polymerization inhibitor is added at a mole equivalent ratio of 0.1 to 1.5 referring to 1 mole equivalent of aluminum.

5. The process according to claim 1, wherein an additional understoichiometric quantity of acid is added to the alumina hydrate after removing the alcoholic components, the maximum of a mole equivalent ratio of 1.5 referring to 1 mole equivalent of aluminum not being exceeded.

6. The process according to claim 1, wherein the alumina hydrates are further subjected after removing the alcoholic components to hydrothermal postaging whereby the alumina hydrate particles are stabilized without altering their structures such that a subsequent drying step will prevent aggregation of the primary agglomerates.

7. The process according to claim 1 wherein the polymerization inhibitor is added at a mole equivalent ratio of 0.1 to 0.5 referring to 1 mole equivalent of aluminum.

8. The process according to claim 1 wherein the process further comprises drying the alumina hydrates after removing the alcoholic components.

9. The process according to claim 1 wherein the aluminum alcoholates are aluminum alcoholate mixtures obtained as intermediates in the Ziegler-Alfol synthesis.

10. The process according to claim 1 wherein the polymerization inhibitor is added to the aluminum alcoholate prior to hydrolysis with water.

11. The process according to claim 10 wherein the water for hydrolysis also comprises polymerization inhibitor.

12. A method comprising the steps of:
drying an alumina hydrate produced as defined by claim 11 and
using said dried alumina hydrate for the manufacture of catalyst supports.

13. The process according to claim 1 wherein the polymerization inhibitor, water for hydrolysis and the aluminum alcoholate are brought together with each other in one step.

14. A method for coating materials selected from the group consisting of glass, metals or plastics in order to protect said materials from chemical and/or thermal attack comprising the steps of:
producing water-dispersible alumina hydrates which give clear, translucent colloids when dispersed in water, comprising the steps of
converting aluminum alcoholates selected from the group consisting of aluminum trialcoholates, partially substituted aluminum monoalcoholates, aluminum dialcoholates, and mixtures thereof; which aluminum alcoholates have chain lengths of $C_2$–$C_{10}$ into nanocrystalline alumina hydrates with crystallite sizes of smaller than 4 nm, measured on the 021 reflex, which conversion is carried out at temperatures of 30° C. to 110° C. and comprises hydrolysis and polycondensation
in the presence of water of hydrolysis and
an understoichiometric quantity of at least one polymerization inhibitor selected from the group consisting of inorganic and organic, monovalent acids, said organic, monovalent acids being selected from the group consisting of formic acid, acetic acid, propionic acid and the anhydrides thereof, and organic acids as defined above comprising an additional functional group selected from the group consisting of the hydroxyl group, the chloride group and the amino group,
where the of the polymerization inhibitor is added either to the aluminum alcoholate and/or to the water of hydrolysis, and
substantially removing alcoholic components;
forming dispersions by mixing the alumina hydrates in water to give dispersions having an $Al_2O_3$ content of 1 to 20%; and
coating a material selected from the group consisting of glass, metals and plastics
wherein the water-dispersible alumina hydrates when dry have the following properties:
a dispersibility of greater or equal to 82.6% where 10 wt. % of the hydrates, calculated as $Al_2O_3$, are mixed with only water, and
a translucency of greater than or equal to 71.6% measured by spectroscopic analysis at 450 nm from a dispersion made as described above and further diluted 1:10 with water.

15. The method according to claim 14 where in producing water-dispersible alumina hydrates having a boehmite structure, the polymerization inhibitor is added to the aluminum alcoholate prior to hydrolysis with water.

16. The method according to claim 15 where in producing water-dispersible alumina hydrates having a boehmite structure, the water for hydrolysis also comprises polymerization inhibitor.

17. The method according to claim 14 where in producing water-dispersible alumina hydrates having a boehmite structure, the polymerization inhibitor, water for hydrolysis and the aluminum alcoholate are brought together with each other in one step.

18. A water-dispersible alumina hydrate made by a process comprising the steps of:
converting aluminum alcoholates selected from the group consisting of aluminum trialcoholates, partially substituted aluminum monoalcoholates, aluminum dialcoholates, and mixtures thereof; which aluminum alcoholates have chain lengths of $C_2$–$C_{10}$ into nanocrystalline alumina hydrates, which conversion is carried out at temperatures of 30° C. to 110° C. and comprises hydrolysis and polycondensation in the presence of water and an understoichiometric quantity of a polymerization inhibitor selected from the group consisting of inorganic and organic, monovalent acids or the anhydrides thereof, inorganic and organic, monovalent acids or the anhydrides thereof having an additional functional group, where the polymerization inhibitor is added either to the aluminum alcoholate and/or to the water of hydrolysis, and
substantially removing alcoholic components,
where the water-dispersible alumina hydrate has a crystallite size of smaller than 4 nm, measured on the 021 reflex, and wherein the water-dispersible alumina hydrates when dry have the following properties:
a dispersibility of greater or equal to 82.6% where 10 wt. % of the hydrates, calculated as $Al_2O_3$, are mixed with only water, and
a translucency of greater than or equal to 71.6% measured by spectroscopic analysis at 450 nm from a dispersion made as described above and further diluted 1:10 with water.

19. A method comprising the steps of:
drying an alumina hydrates produced as defined by claim 18 and
mixing said dried alumina hydrate with other oxidic materials or their precursors on a nanocrystalline basis whereby true-phase mixed oxide crystals are formed by calcination, for producing spinels or mullites.

20. A method comprising the steps of:
drying an alumina hydrates produced as defined by claim 18; and
producing high-performance abrasives by a process comprising the steps of:
adding $Al_2O_3$ nuclei in the form of bayerite or the eta phase thereof,
adding an acid,
obtaining a gel,
dehydrating the gel to form the alpha phase, and
producing microcrystalline corundum.

21. The water-dispersible alumina hydrate according to claim 18, wherein said polymerization inhibitors are selected from the group consisting of
inorganic acids, further selected from the group consisting of
hydrochloric acid and hydrogen chloride, nitric acid and $NO_2$ gas, carbonic acid and $CO_2$, and organic acids, further selected from the group consisting of formic acid, acetic acid, propionic acid and the anhydrides thereof and short-chain, monovalent organic acids and inorganic acids and organic acids as defined above having an additional functional group selected from the group consisting of the hydroxyl group, the chloride and the amino group.

22. The water-dispersible alumina hydrate according to claim 18, wherein the polymerization inhibitor is added at a mole equivalent ratio of understoichiometric referring to 1 mole equivalent of aluminum.

23. The water-dispersible alumina hydrate according to claim 18 wherein the polymerization inhibitor is added to the aluminum alcoholate prior to hydrolysis with water.

24. The water-dispersible alumina hydrate according to claim 23 wherein the water for hydrolysis also comprises polymerization inhibitor.

25. The water-dispersible alumina hydrate according to claim 18 wherein the polymerization inhibitor, water for hydrolysis and the aluminum alcoholate are brought together with each other in one step.

* * * * *